US00RE37509B1

(19) United States
(12) Reissued Patent
Bradshaw et al.

(10) Patent Number: US RE37,509 E
(45) Date of Reissued Patent: Jan. 15, 2002

(54) SMECTIC LIQUID CRYSTAL DEVICES

(75) Inventors: Madeline J. Bradshaw, Gloucestershire; Edward P. Raynes, Worcestershire, both of (GB)

(73) Assignee: The Secretary of State for Defence in Her Britannic Majesty's Government of the United Kingdom of Great Britian and Northern Ireland, London (GB)

( * ) Notice: This patent is subject to a terminal disclaimer.

(21) Appl. No.: 08/371,035

(22) Filed: Jan. 10, 1995

Related U.S. Patent Documents

Reissue of:
(64) Patent No.: 5,061,047
Issued: Oct. 29, 1991
Appl. No.: 07/279,553
Filed: Dec. 1, 1988

U.S. Applications:

(63) Continuation of application No. PCT/GB87/00222, filed on Apr. 1, 1997.

(30) Foreign Application Priority Data

Apr. 3, 1986 (GB) ..... 8608114

(51) Int. Cl.[7] ..... G02F 1/13
(52) U.S. Cl. ..... 349/172; 349/184; 349/171
(58) Field of Search ..... 349/19, 37, 97, 349/100, 133, 134, 171, 172, 184, 188, 189, 191

(56) References Cited

U.S. PATENT DOCUMENTS 4,025,164 A * 5/1977 Doriguzzi et al. ..... 349/97
4,264,148 A * 4/1981 Gobl-Wunsch et al. . 350/350 X
4,328,493 A * 5/1982 Shanks et al. ..... 345/94
4,367,924 A 1/1983 Clark et al.
4,561,725 A 12/1985 Hotta
4,563,059 A 1/1986 Clark et al.
4,582,396 A * 4/1986 Bos et al. ..... 349/180
4,639,089 A 1/1987 Okada et al.
4,655,561 A 4/1987 Kanbe et al.
4,689,176 A * 8/1987 Inoue et al. ..... 350/350 S X
4,709,994 A 12/1987 Kanbe et al.
4,720,173 A 1/1988 Okada et al.
4,838,663 A * 6/1989 Lagerwall et al. ..... 350/350 S
4,882,085 A * 11/1989 Yoshinaga et al. ... 350/350 S X
4,909,607 A 3/1990 Ross

FOREIGN PATENT DOCUMENTS

DE 3502160 * 7/1985
EP 1 491 471 11/1977
EP 0 008 956 3/1980

(List continued on next page.)

OTHER PUBLICATIONS

J. Dijon, Ferroelectric LCDs, 1987.*
Pelzl et al. "Tilt angle determination of a Smectic C phase by Field–Induced Freedericksz Transition and X–ray investigations", Mol. Cryst. Liq. Cryst., vol. 53, pp. 167–180.*
European Search Report.*

(List continued on next page.)

*Primary Examiner*—Kenneth Parker
(74) *Attorney, Agent, or Firm*—Nixon & Vanderhye P.C.

(57) ABSTRACT

A method, device, and material for providing a fast switching liquid crystal display employs the ferro electric effect of chiral smectic liquid crystal material. To provide a uniform appearance the liquid crystal material is arranged to have a long cholesteric pitch at a temperature close to a smectic/cholesteric phase transistion temperature. This long cholesteric pitch allows liquid crystal molecules to cool from the cholesteric to smectic phase with a uniform alignment. The smectic material is contained in a cell between wells (2, 3) bearing electrodes (5, 6) and surface treated to provide homogeneous alignment of liquid crystal material (7).

67 Claims, 6 Drawing Sheets

FOREIGN PATENT DOCUMENTS

| | | | |
|---|---|---|---|
| EP | 0091637 | * | 4/1983 |
| EP | 0092181 | * | 4/1983 |
| EP | 0 091 637 | | 10/1983 |
| EP | 0 092 181 | | 10/1983 |
| EP | 0138006 | * | 8/1984 |
| EP | 0136725 | * | 10/1984 |
| EP | 0149398 | * | 12/1984 |
| EP | 0 136 725 | | 4/1985 |
| EP | 0 138 006 | | 4/1985 |
| EP | 0 149 398 | | 7/1985 |
| EP | 0 156 726 | | 10/1985 |
| EP | 0179592 | * | 10/1985 |
| EP | 0 160 302 | | 11/1985 |
| EP | 0 179 592 | | 4/1986 |
| EP | 0 201 341 | | 11/1986 |
| EP | 2 174 820 | | 11/1986 |
| EP | 0 227 419 | | 7/1987 |
| EP | 0227419 | * | 7/1987 |
| FR | 2567533 | * | 7/1985 |
| FR | 2 563 018 | | 10/1985 |
| FR | 2 567 533 | | 1/1986 |
| GB | 2 007 865 | | 5/1979 |
| GB | 1 569 686 | | 6/1980 |
| GB | 2 163 273 | | 2/1986 |
| GB | WO87/06022 | * | 10/1987 |
| JP | 56-95977 | | 8/1981 |
| JP | 58-173719 | | 10/1983 |
| JP | 59-53815 | | 3/1984 |
| JP | 60-156043 | | 8/1985 |
| JP | 60-143422 | | 9/1985 |
| JP | 60-161326 | | 10/1985 |
| JP | 61-174294 | | 8/1986 |
| JP | 61-252532 | | 11/1986 |
| JP | 62-192724 | | 8/1987 |
| WO | WO 87/06021 | | 10/1987 |
| WO | WO 87/06022 | | 10/1987 |

OTHER PUBLICATIONS

Applied Physics Letters, vol. 47, No. 12, Dec. 15, 1985; Am. Institute of Physics, (Woodbury, N.Y. U.S.A.); pp. 1277–1279.*

Electronics International, vol. 56, No. 10, May 1983, (New York U.S.A.), C. Electronics International, vol. 56, No. 10, May 1983, (New York U.S.A.), C. Barney: "FastLC Switch Handles Color"; pp. 52, 54.*

Molecular Crystals & Liquid Crystals, vol. 110, 1984; Gordon & Breach, Science Pub., Inc., J. W. Goodby et al. "Ferroelectric Liquid Crystals)", pp. 175–203.*

Le Pesant et al.; "Optical Switching of Chiral Smectic C at Room Temperature"; Mol. Cryst. Liq. Cryst., vol. 129, 1985, pp. 61–74.

Becker et al.; "Alignment Properties of Rubbed Polymer Surfaces"; Mol. Cryst. Liq. Cryst. vol. 132, 1986, pp. 167–180.

Bahadur; "Liquid Crystal Displays"; Nol. Cryst. Liq. Cryst; vol. 109, No. 1, 1984, pp. 59–71.

Flatischler et al,; "Thin Ferroelectric Liquid Crystal Cells with Surface–Induced Alignment: Optical Characterization and Electro–Optic Performance"; Mol. Cryst. Liq. Cryst.; vol. 131, 1985, pp. 21–46.

Chandrasekhar; "Liquid Crystals"; Rep. Prog. Phys.; vol. 39, 1976, pp. 670–673.

Lagerwall et al.; "Ferroelectric Liquid Crystals for Display" 1985 International Display Research Conference; 1985; pp. 213–221.

Matsumoto et al.; Polarity of Spontaneous Polarization of Ferroelectric Liquid Crystal Materials; Preprint of 11th Forum on Liquid Crystals; 1985, pp. 1–6.

Patel et al.; "A Reliable Method of Alignment for Smectic Liquid Crystals"; Ferroelectrics, vol. 59, 1984, pp. 137–144.

Williams et al.; Alignment of Chiral Smectic Liquid Crystals; J. Phys. D: Appl. Phys.; vol. 19, No. 3, Mar. 14, 1986, pp. L37–L41.

Fukuda et al.; "High Speed Displays Using Ferroelectric Liquid Crystal"; Optronics; No. 9, pp. 64–70.

Patel, "Room–Temperature Switching Behavior of Ferroelectric Liquid Crystals in Thin Cells"; Appl. Phys. Lett. 47 (12), Dec. 15, 1985; pp. 1277–1279.

Barney; "Fast LC Switch Handles Color"; Electronics; vol. 56; May 19, 1993; pp. 52–53.

Goodby et al.; "Ferroelectric Liquid Crystals—Structure and Design"; Mol. Cryst. Liq. Cryst.; 1984; vol. 110; pp. 175–203.

Clark et al.; "Submicrosecond Bistable Electro–Optic Switching in Liquid Crystals"; Appl. Phys. Lett., 36(11), Jun. 1, 1980; pp. 899–901.

* cited by examiner

SMECTIC LIQUID CRYSTAL DEVICES

Matter enclosed in heavy brackets [ ] appears in the original patent but forms no part of this reissue specification; matter printed in italics indicates the additions made by reissue.

This application is a continuation of PCT/GB00222 filed Apr. 1, 1987 which is based on British Patent Application 86 08114 filed Apr. 3, 1986.

The invention relates to smectic liquid crystal devices.

Liquid crystal devices commonly comprise a thin layer of a liquid crystal material contained between two glass plates or walls. A thin transparent electrode is deposited on the inner face of both walls. The combination of liquid crystal layer, walls, and electrode is often termed a liquid crystal cell. When an electric field is applied between the two electrodes, liquid crystal molecules rotate in the field to an ON state. On removal of the field the molecules rotate back to an OFF state, determined by a surface treatment applied to the walls before cell assembly and by the type of liquid crystal material. The optical transmission characteristics of the ON and OFF states are different. Some devices need one or two polarisers and/or dyes to visibly distinguish between ON and OFF states.

There are broadly three different types of liquid crystal material, nematic, cholesteric, and smectic, each distinguished by a different molecular ordering.

Such materials only show a liquid crystal phase over a limited temperature range between the solid and isotropic liquid phases. Within the liquid crystal phase temperature range a material may exhibit one or more of the nematic, cholesteric or smectic phase types. Normally a material is chosen such that it forms only one type of liquid crystal phase over its working temperature range.

The present invention concerns devices using smectic liquid crystal materials.

Displays have been made with the electrodes formed These collectively form an x, y matrix of separately addressable elements on a large display. One way of addressing such a display is by multiplexing i.e. addressing each row in sequence until the whole display has been addressed. This is repeated all the time that a display is needed. Another type of display uses the ON and OFF states to form an electrically switchable optical shutter. Yet another type of display is used as an optical storage device. Nematic cholesteric and smectic liquid crystal material have been used for such devices. A problem with many displays is the time taken to switch between the two states i.e. the response times. For many displays a fast response time is needed. A nematic material, arranged in a 90° twisted structure typically has a response time of 100 milliseconds.

Devices comprising smectic materials have not been used as widely as devices with nematic or cholesteric materials. Available display devices based on smectic materials did not have the necessary characteristics. Recently however ferro electric smectic devices with fast switching and bistability characteristics have become of interest. N. A. Clark & S. T. Lagerwall, App. Phys. Letters 35 (11) 1090 pp 899–901. Chiral liquid crystal materials in a tilted smectic phase, e.g. $S_C^*$, $S_I^*$, $S_F^*$, $S_J^*$, $S_G^*$, $S_H^*$ are known to exhibit ferroelectric properties. This has been described by R. B. Meyer, L. Liebert, L. Strzelecki and P. Keller, J. de Physique (Lett), 36, L-69 (1975).

According to this invention a method of making a liquid crystal display device comprises the steps;

providing two cell walls spaced apart by a spacer to contain a layer of a liquid crystal material, the wall inner surfaces having formed thereon electrode structures and at least one wall surface treated to provide a liquid crystal alignment, providing a tilted chiral smectic liquid crystal material having a cholesteric phase at an elevated temperature above ambient between the chiral smectic and isotropic phases with a cholesteric pitch p greater than half the layer thickness d at a temperature at least 0.1° C. above a cholesteric to smectic transition temperature and a significant spontaneous polarization Ps in the chiral smectic phase, heating the mixture to the cholesteric phase, introducing and sealing the mixture into the space between the walls, cooling the material to the tilted chiral smectic phase.

The heating step may be before or after introduction of the material to the space.

The liquid crystal material may be a single component or a mixture of components. The material may combine one or more chiral components with laevo (left hand) cholesteric twist sense with one or more chiral components with dextro (right hand) cholesteric twist sense. With such a mixture none of the laevo components can be the racemates of the dextro components. This chiral mixture may be a chiral smectic itself or may be used as an additive to a non-chiral and/or racemate tilted smectic liquid crystal host material. Alternatively the chiral component or components may have the same cholesteric twist sense providing the cholesteric pitch and Ps have the above values.

The smectic phase has at least one of the following chiral tilted smectic phases C*, I*, F*, J*, G*, K*, H* depending on temperature and may include a smectic A phase between the cholesteric to chiral smectic phase transition.

The layer thickness may be up to 15 $\mu$m or more, but is typically 1–12 $\mu$m, e.g. 2 $\mu$m and 6 $\mu$m.

The p/d ratio is large enough to prevent the material, in its cholesteric phase close to the cholesteric to smectic phase transition, adopting more than a 3 $\pi$ twist, ideally the pitch p is greater than 4d, so that less than $\pi$ twist can occur in the cholesteric phase near the transition. Ideally this value of p is large over the whole cholesteric phase, preferably is large for 5° C. above the smectic/cholesteric transition.

The pitch in the smectic phase is greater than 0.1 $\mu$m and preferably much greater, e.g. greater than layer thickness.

The value of Ps is at least 0.1 and preferably 1 or more nC/cm$^2$. All the chiral components may have substantial values of Ps and the same sense of Ps. Alternatively one or more components may have Ps values of opposite senses providing the net Ps is substantial.

For some mixtures the cooling is at a rate of between 0.05° and 2° C./minute within +/−5° C. of the cholesteric to smectic phase transition. The rate of cooling depends upon the amount of compensation in the cholesteric phase. For well compensated material the cell may be cooled as quickly as is convenient, e.g. 20° C./minute or more.

According to this invention a liquid crystal device comprises a layer of a tilted chiral smectic liquid crystal material contained between two cell walls each carrying electrode structures and at least one wall surface treated to give alignment to the liquid crystal molecules, a first linear polarizer and either a second polarizer or an amount of dichroic dye in the liquid crystal material, a liquid crystal material having a tilted chiral smectic phase at normal device operating temperatures and a cholesteric phase at a higher, above ambient, temperature, with a cholesteric pitch greater than half the layer thickness in the cholesteric phase for at least 0.1° C. above the cholesteric to smectic transition temperature, and a substantial spontaneous polarization.

The device cell may be arranged between two polarizer arranged with their optical axes parallel or at a non zero angle to one another. Alternatively the liquid crystal mixture may include an amount of a dichroic dye. In this case only one polariser is needed.

The device may further include means for applying two d.c. voltages of opposite polarity to the electrode structures whereby the molecules of the mixture are forced to lie in one of two different positions depending on the polarity of applied voltage and switch between these two positions as the polarity is changed.

The cell wall surface treatment may provide similar alignment, in the same or different directions, or different types of alignment, e.g. homogeneous and homoetropic, on the two walls. Alternatively one wall may be left cleaned but with no surface alignment.

According to this invention a liquid material mixture for use in a tilted chiral smectic liquid crystal device comprises a material having a tilted chiral smectic phase at normal device operating temperatures and a cholesteric phase at an elevated temperature, the mixture having a cholesteric pitch greater than 4 $\mu$m in the cholesteric phase at least 0.1° C. above a cholesteric to smectic transition temperature, and a substantial spontaneous polarization coefficient Ps, in the smectic phase.

The device operating temperature typically falls within the range of 0° to 40° C. although for some devices mounted on equipment the upper operating temperature may be about 100° C. or even higher.

Use of chiral components in nematic liquid crystal material is well known. The addition of a chiral component imparts a twist direction to the nematic material director and results in a cholesteric material. The direction of this twist can either be clockwise or anticlockwise, i.e. right or left rotation. Adding two different chiral materials of opposite twist can result in zero twist depending upon the composition and temperature of the mixture. Some compounds can have molecules with both right and left rotary power, these are optical isomers when the optical isomers are present in equal amounts a racemic mixture is formed with is indistinguisable from ordinary non-chiral liquid crystalline materials.

BRIEF DESCRIPTION OF THE DRAWINGS

One form of the invention will now be described, by way of example only, with reference to the accompanying drawings in which.

Figure 9:
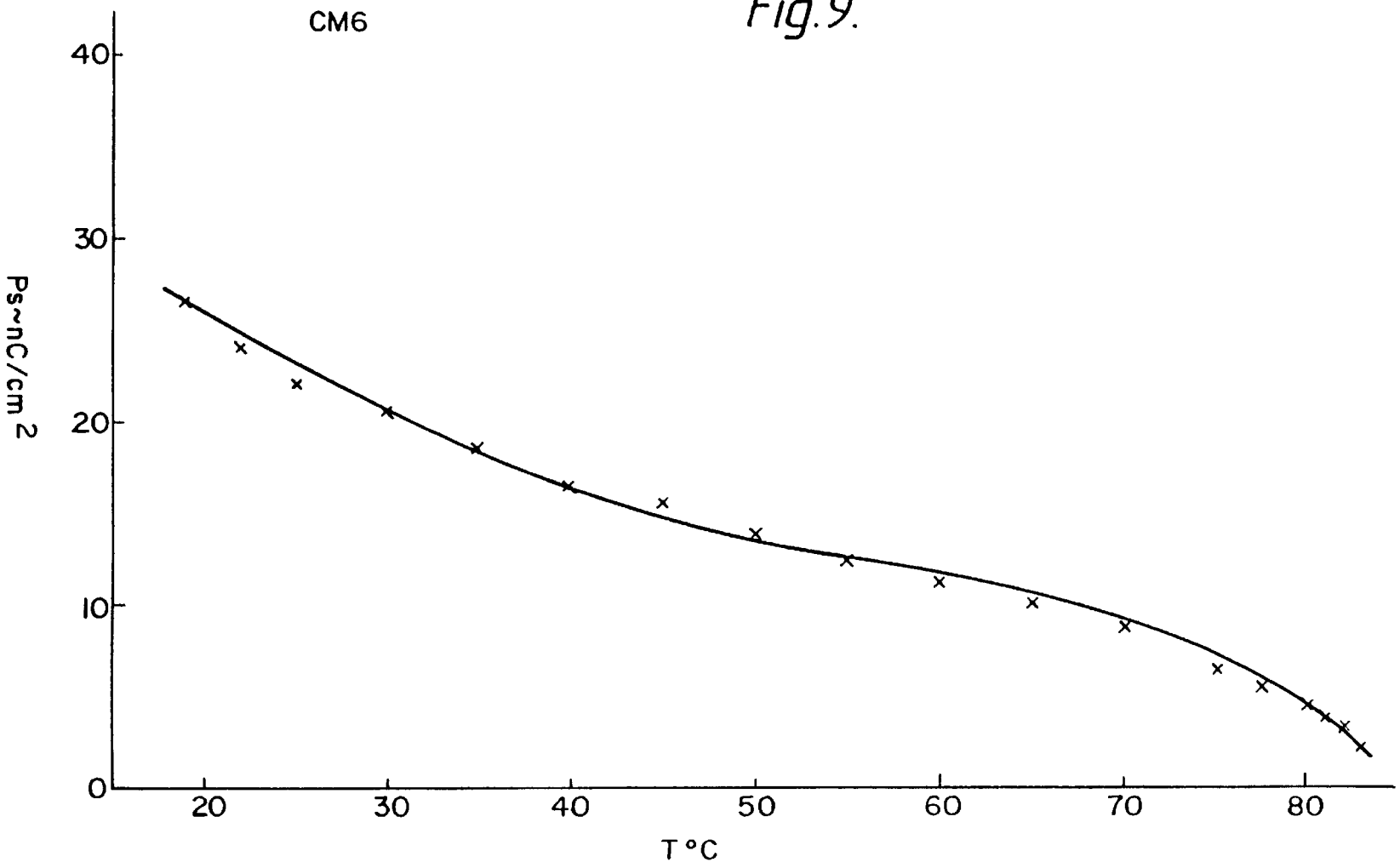

DOWN states for one material mixture;

FIG. 9 is a graph showing variation of Ps with temperature for one material mixture.

DESCRIPTION OF PREFERRED EMBODIMENT

Figure 1:
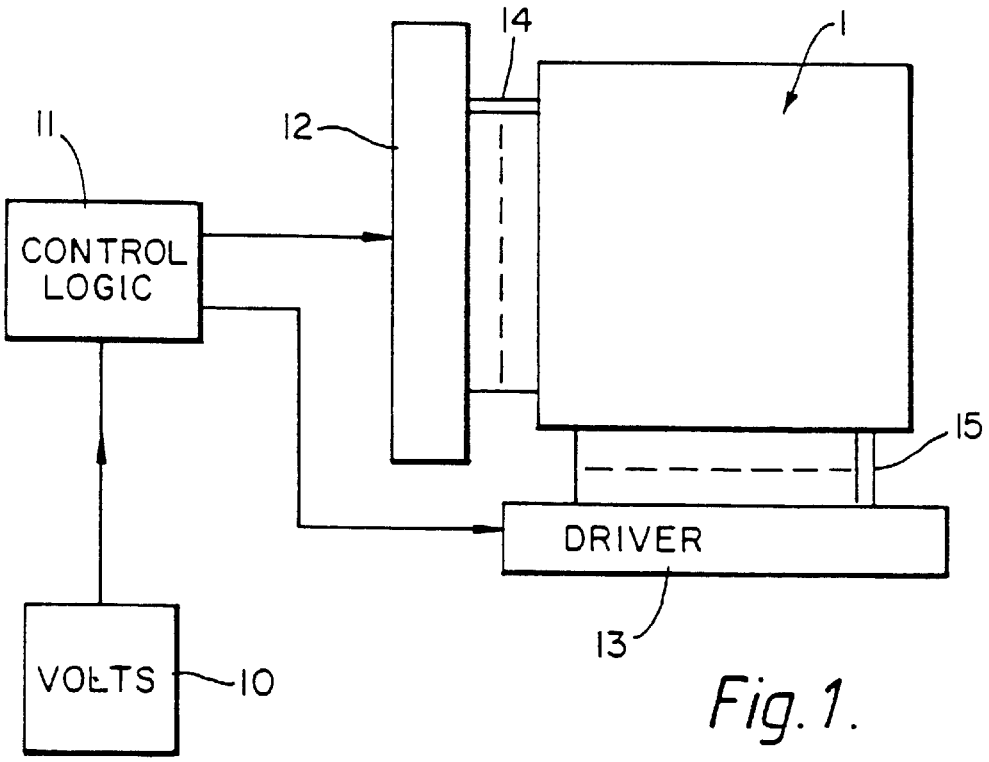
FIGS. 1, 2, are plan and section views of a liquid crystal display device.
Figure 2:
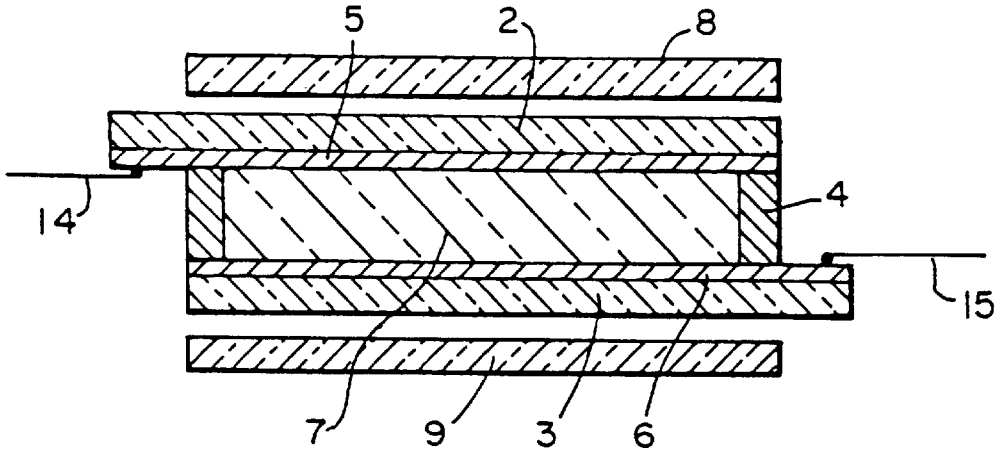

The cell 1 shown in FIGS. 1, 2 comprises two glass walls, 2, 3, spaced about 1–6 $\mu$m apart by a spacer ring 4 and/or distributed spacers. Electrode structures 5, 6 of transparent tin oxide are formed on the inner face of both walls. These electrodes may be of conventional row and column shape or seven segment display. A layer 7 of liquid crystal material is contained between the walls 2, 3 and spacer ring 4. Polarizers 8, 9 are arranged in front of and behind the cell 1. The alignment of the optical axis of each polarizer is discussed later. To an approximation the polarizers are crossed and the optical axis of one is nearly parallel or perpendicular to a liquid crystal molecular alignment direction. A d.c. voltage source 10 supplies power through control logic 11 to driver circuits 12, 13 connected to the electrode structures 5, 6, by lead wires 14, 15.

Prior to assembly the walls 2, 3 are surface treated by spinning on a thin layer of polyamide or polyimide, drying and where appropriate curing; then buffing with a soft cloth (e.g. rayon) in a single direction R1, R2. This known treatment provides a surface alignment for liquid crystal molecules. The molecules align themselves along the rubbing direction R1, R2, and at an angle of about 2° to the surface. The directions R1, R2 may in the same or opposition directions. When R1, R2 are arranged in the same direction the contacting liquid crystal molecules tilt towards the layer centre and adapt a splayed configuration across the layer thickness. Surface alignment may be provided by the known process of obliquely evaporating silicon oxide onto the cell walls. As for rubbing alignment the alignment can be parallel in the same or opposite direction. Alternatively one wall may be either left uncoated, or coated with e.g. polyamide and not buffed. Alignment is then provided by the other, rubbed wall surface.

The device may operate in a transmissive or reflective mode. In the former light passing through the device e.g. from a tungsten bulb is selectively transmitted or blocked to form the desired display. In the reflective mode a mirror is placed behind the second polarizer 9 to reflect ambient light back through the cell 1 and two polarizer. By making the mirror partly reflecting the device may be operated both in a transmissive and reflective mode.

Pleochroic dyes may be added to the material 7. In this case only one polarizer is needed.

Figure 3:
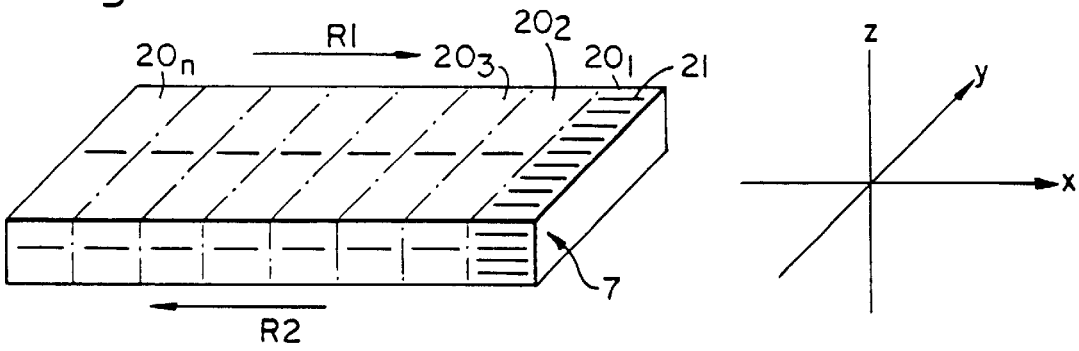
FIGS. 3, 4, 5, are stylised views of a layer of aligned liquid crystal material showing smectic A, smectic C and smectic C* material respectively.
Figure 4:
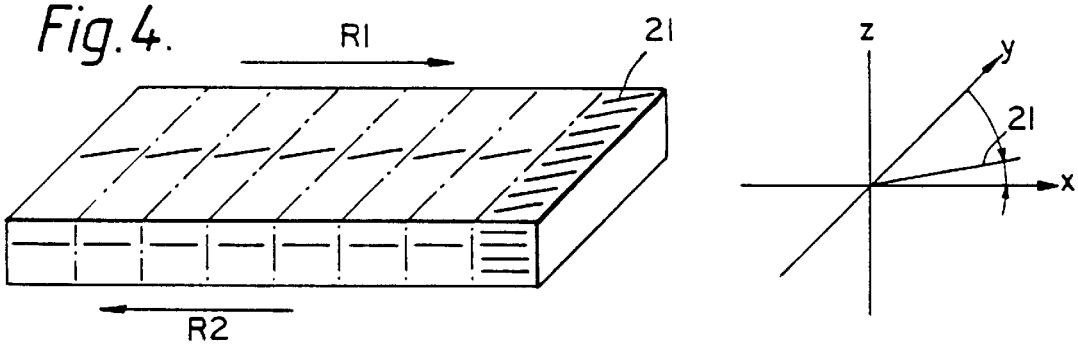
Figure 5:
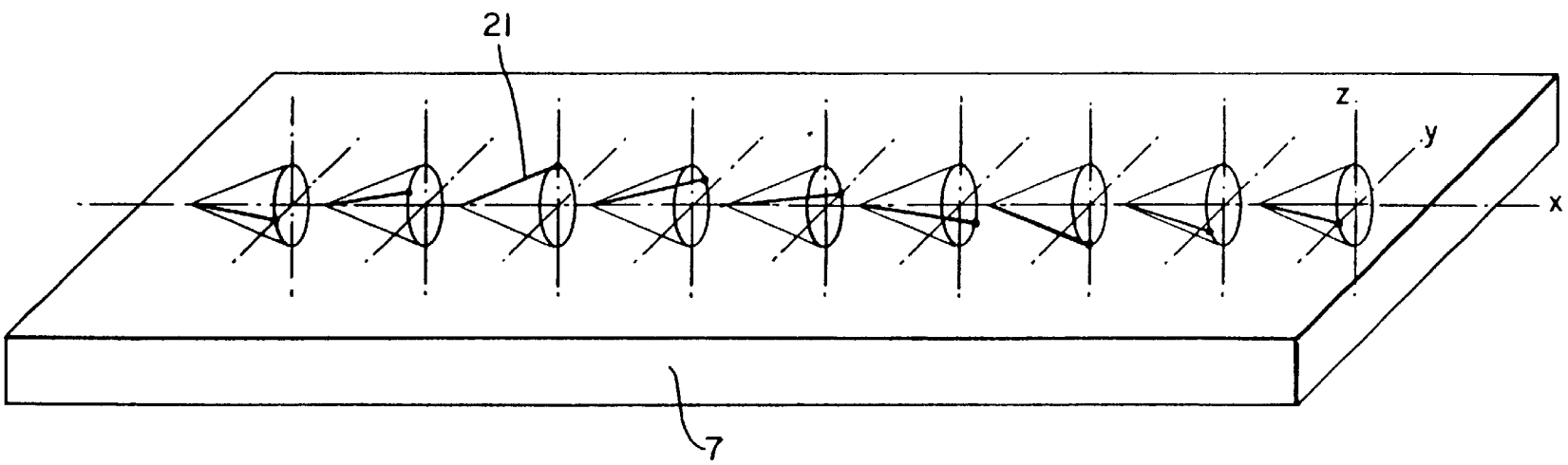

An idealised, and somewhat simplistic, arrangement of liquid crystal molecules within a cell is shown diagrammatically in FIGS. 3, 4, 5. In practice these arrangements may differ considerably from those illustrated, depending in part on cell wall surface effects.

FIG. 3 shows a layer 7 of smectic A ($S_A$) material. Axes x, y, z, are used to define directions. The liquid crystal layer lies in x, y plane, layer thickness is in the z direction, rubbing directions R1, R2, are +x, and −x for the upper and lower wall respectively. For an $S_A$ material with these alignments the individual molecules 21 align in the x direction in layers 20 parallel to the y, z plane.

FIG. 4 shows a layer of smectic C ($S_C$) material. Surface alignment is +x and −x as in FIG. 3.

As in FIG. 3 the liquid crystal molecules 21 form into layers 20 parallel to the y, z plane. However $S_C$ molecules 21 adopt a tilted formation within each layer. The tilt is in an x, y plane and at an angle θ to the x axis. Typically θ is 15°–25° depending on material composition and temperature.

FIG. 5 illustrates smectic pitch in a layer 7 of smectic C* ($S_C$*), material. This material forms in layers 20n, with the molecules 21n in each layer lying at an angle 15°–25° to the x axis and with this angle 15°–25° varying in each layer 21. Collectively the molecules form into a twisted structure with the twist axis along the x axis. This is shown in FIG. 5 where the molecular alignment in successive layers 21 is shown lying along the surface of a cone with a 45° change between each layer.

The structure of FIG. 5 is termed a tilted chiral smectic phase. Such materials can be produced by the addition of a chiral material to a smectic material. The chiral additive may have either a clockwise or anticlockwise twist, some compounds may have molecules with both senses of twist direction, in which case the material can be racemate. Tilted chiral smectic materials can have a spontaneous polarization and there are two opposing directions for this depending on the configuration of the molecule. In a racemate material the two spontaneous polarization (Ps) directions are equal and cancel one another and there is no net Ps. With a mixture of chiral compounds of opposite twist directions Ps can either be additive or subtractive. Providing there is a net Ps the mixture will exhibit a ferroelectric characteristic.

One way of producing an aligned $S_C$* layer 7 is heating the material into an $S_A$ phase where it is aligned by the cell surface treatment, and then cooling to the $S_C$* phase. Unfortunately this cooling can also form the material into a small focal conic structure; a state with layers of molecules lying in many planes at different angles to one another.

The present invention overcomes this problem by using a material having a cholesteric phase above the smectic phase and providing a suitable cholesteric pitch as follows:

The material is one having the following phases with increasing temperature;

solid—smectic X*—smectic A—cholesteric—isotropic solid—smectic X*—cholesteric—isotropic where X* is at least one of the following:—C*, I*, F*, J*, G*, K*, H*. For materials having more than one such smectic phase the phase varies with temperature.

The pitch p in the cholesteric phase is arranged to ensure that the maximum twist across the layer thickness d is not greater than 3 π. A 3 π twist can occur when p is about 2/3d; a 2 πtwist when p is about d; a π twist when p is about 2d; and zero twist when p>4d. Preferably p>4d.

This cholesteric pitch is necessary for a temperature range of 0.1° C. above the smectic/cholesteric transition. Preferably this range is 5° C. above the transition and ideally over the entire cholesteric phase.

There are a number of ways of achieving the above material. For example combining one or more chiral components with laevo (left) cholesteric twist sense with one or more chiral components with dextro (right) cholesteric twist sense, with the proviso that none of the laevo components are the racemates of the dextro components. Such a mixture may be used by itself if it has the necessary smectic phases. Alternatively the chiral mixture may be added to a non-chiral or a racemate liquid crystal material, e.g. a smectic C host. Different chiral components may have different temperature/pitch characteristics. In this case it is necessary to ensure that the resultant pitch has the required value in the temperature range above the smectic/choesteric phase transition.

When using chiral components of opposite twist sense it is necessary to ensure that the resultant mixture has the required spontaneous polarization value Ps. Thus all of the chiral components, regardless of their cholesteric twist sense, may have the same sense of $S_C$* polarization, i.e. their Ps add. Alternatively one or more of the chiral components may have the opposite sense of Ps providing the net Ps has a sufficient value.

Another way of achieving the above material is to use one or more chiral components with the same cholesteric twist sense and $S_C$* polarisation sense but still satisfying the cholesteric pitch values noted above. Such a mixture may be used alone or in combination with a non-chiral or a racemate liquid crystal material, e.g. a $S_C$ host.

As a result of the long pitch in the cholesteric phase the material cools into the $S_A$ phase with uniform alignment caused by the cell wall treatment. The result is alignment as in FIG. 3. On further cooling the material adopts the $S_C$* phase with alignment approximately as in FIG. 6 for mixtures with sufficiently long $S_C$* pitch such that the surface alignment unwinds the helical pitch, i.e. the $S_C$* pitch is about d, or FIG. 5 for shorter pitch lengths. Materials without an $S_A$ phase are cooled from the cholesteric to a chiral smectic phase. Providing the cholesteric pitch is sufficiently long the cell is well aligned in the S* phase.

The pitch in the tilted smectic phase is arranged to be greater than about 1 μm and preferably very much greater.

Figure 7A:
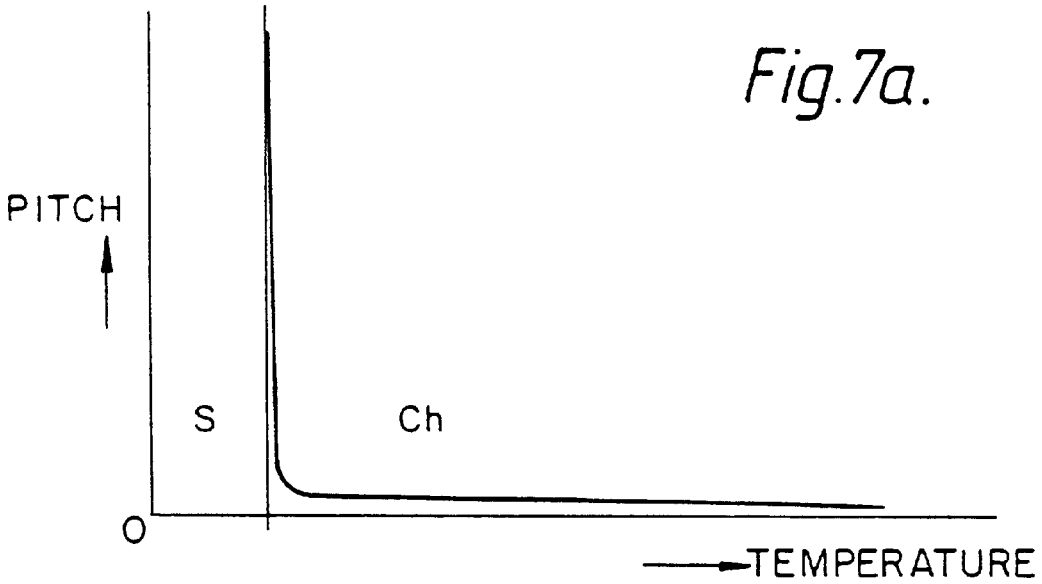
FIGS. 7(a), (b), (c) are graphs of cholestric pitch vs temperature for various mixtures.
Figure 7B:
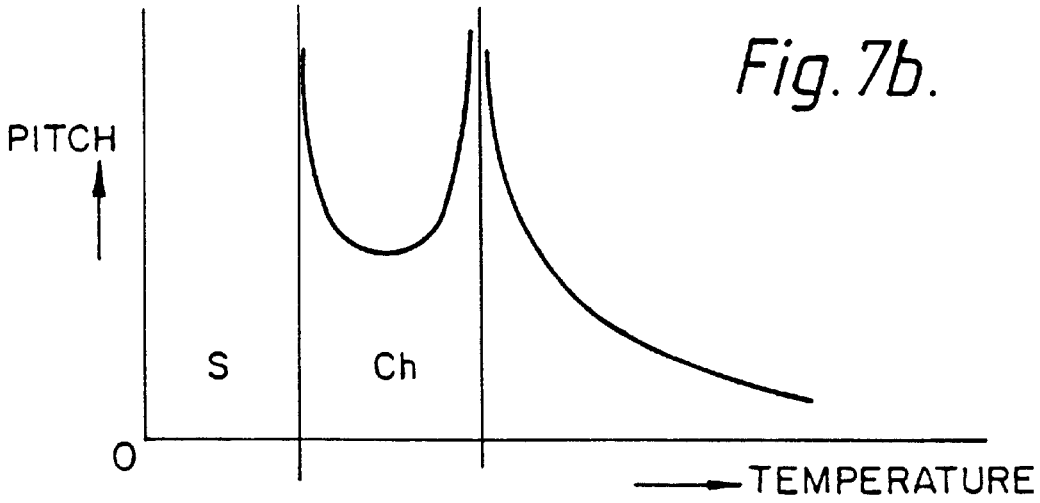

The compensation of pitch in the cholesteric phase is illustrated in FIGS. 7(a), (b), (c). FIG. 7(a) shows cholesteric pitch against temperature for a noncompensated material having a cholesteric to smectic transition. At this transition the pitch tends to infinity. The compensated material shown in FIG. 7(b) shows a pitch increase to infinity a few degrees above the transition temperature with a pitch reduction below. In FIG. 7 the compensation temperature where the pitch goes to infinity occurs just below the smectic to cholesteric transition temperature. By suitable selection of materials this pitch increase can be made to occur even closer to the transition temperature, but a few degrees difference does not seem to affect the end result.

Figure 7C:
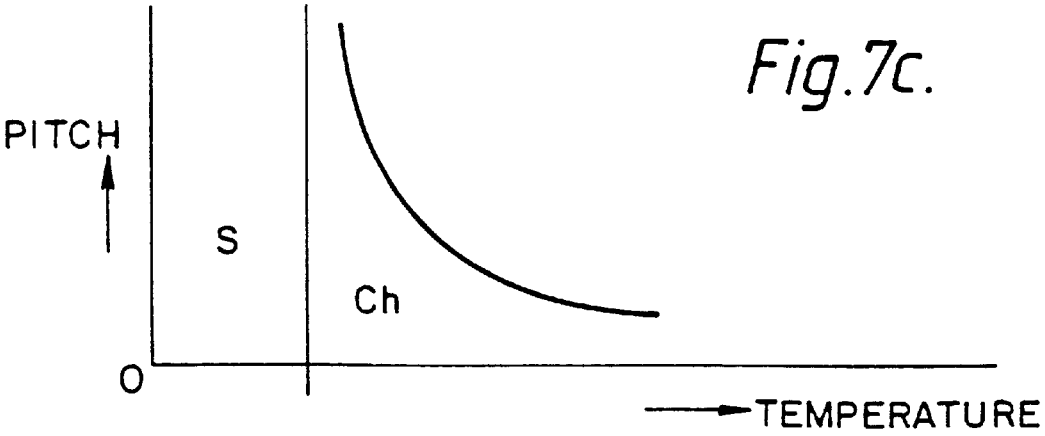

Some dopants e.g. CC10, CC12 can be used alone in small amounts to give a characteristic shown in FIG. 7(c). In this case the material is not compensated as in FIG. 7(b) but inherently has a long pitch.

Figure 6:
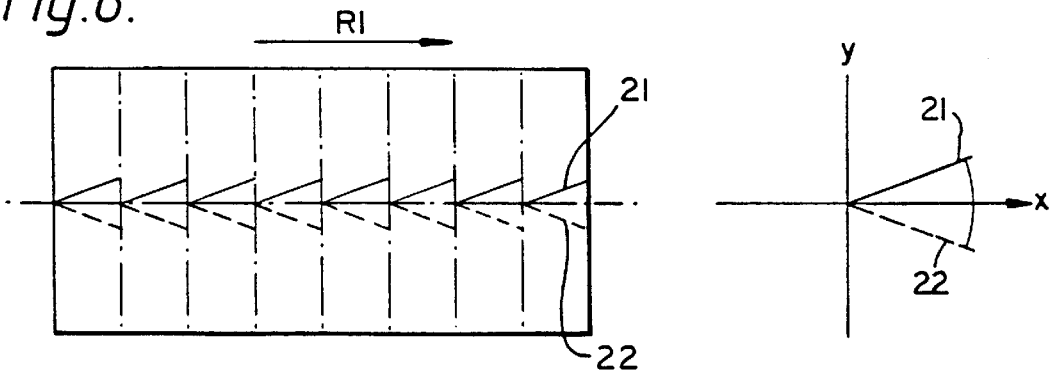
FIG. 6 is a plan view of a $S_C$* cell showing both Ps UP and Ps DOWN molecular alignment states.

When a d.c. pulse of sufficient magnitude is applied to the electrodes 5, 6 the molecules adopt one of two different alignments, D1, D2, depending upon the polarity of the pulse. This is shown in FIG. 6 at 21, 22. Note these alignments may not correspond to a zero field alignment. The two molecules direction D1, D2 represent two different Ps directions, i.e. UP and DOWN directions. The polarisers 7, 8 are arranged with their optical axis orthogonal and with the optical axis of one polarizer 7 or 8 parallel to direction 21, or 22. Alternatively the polarizers 7, 8 axis may be at non parallel and non orthogonal directions. In each case a different effect is observed in the two switched states.

Figure 8:
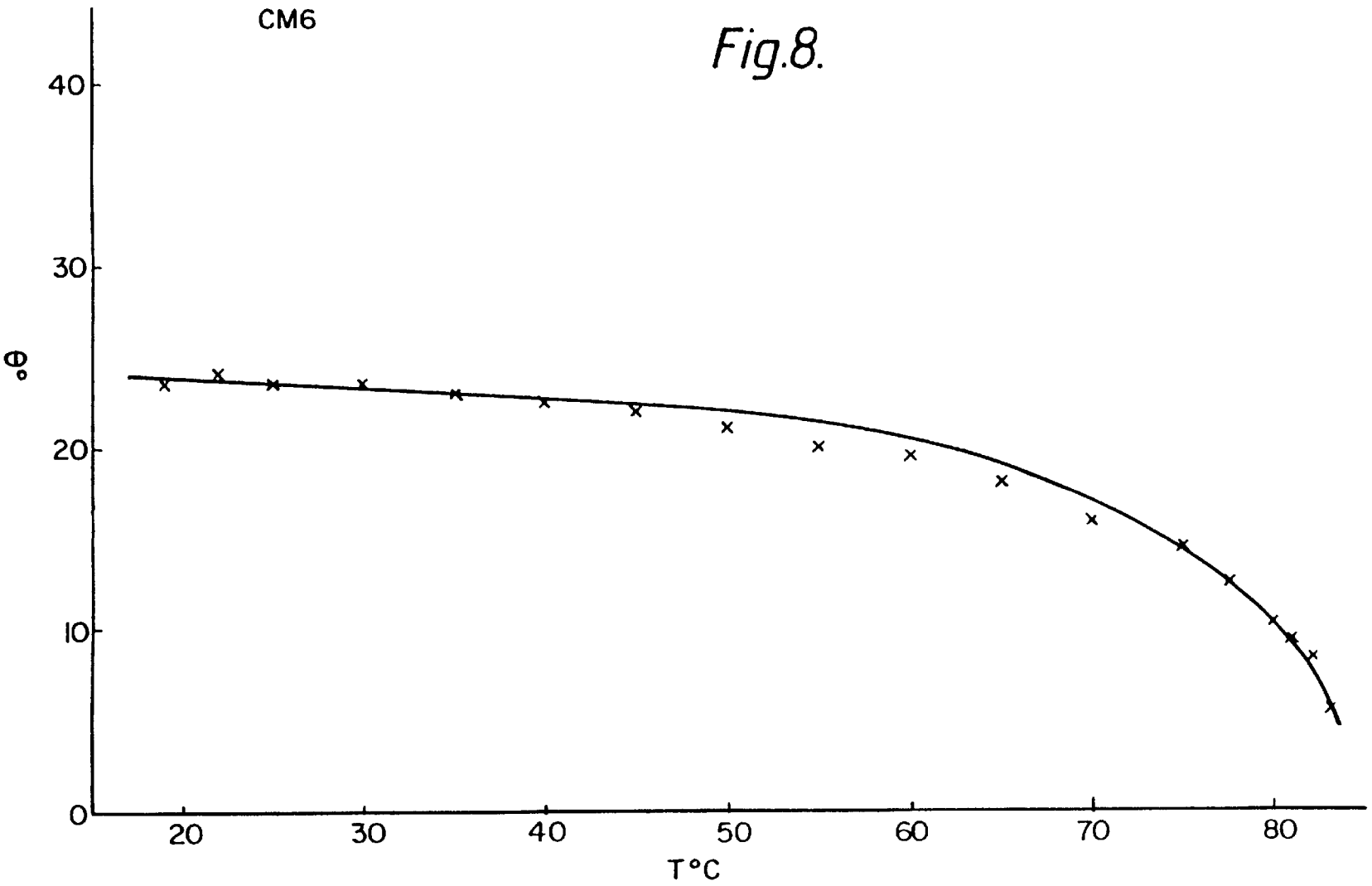
FIG. 8 is a graph showing variation of half cone angle between UP.

The cell is observed to change rapidly between a dark and a light state as the d.c. pulses are applied. The angle between directions 21, 22 depends upon the liquid crystal material. Ideally it will be about 45°. Alternatively, when a dye is incorporated into the liquid material, the ideal angle between directions 21, 22 is about 90° with the single polarizer aligned along or perpendicular to one of the two directions 21, 22. FIG. 8 shows how the angle θ (half the angle between 21, 22) varies with temperature for one material mixture, example 5. The variation of Ps with temperature for this same example 5 is shown in FIG. 9.

The cell 1 may also be used as a shutter when the electrodes 5, 6 are sheet electrodes. Light is blocked or transmitted in the cells of two different switched states. This shutter may also be combined with coloured polarizers to provide a colour switch, arranged in front of a monochrome cathode ray tube (C.R.T.).

A similar arrangement is described in G.B. 1,491,471. In this a C.R.T. emits light in two different wavelengths. The colour switch is switched to transmit the two different colours a frame at a time. This is synchronised to the C.R.T. emitting frame sequential images representing the two different colours. Providing the frame time is high enough an observer's eye integrates the two different colour images as one multicolour image.

The present invention provides a colour switch by using a neutral polarizer on one side of the cell 1 and two different colour, e.g. red and blue, polarizers on the opposite side the cell. These coloured polarizers are arranged with their optical axis orthogonal. The axis of one coloured polarizer is parallel to that of the neutral polarizer. The cell is switched at the C.R.T. frame rate as in G.B. 1,491,471.

The cell may also be used as a 90° polarization switch. In this case the polarizers are arranged with one parallel to the liquid crystal molecules in one of the switched states 21, 22. The second polarizer is crossed with respect to the first polariser. The angle between the two directions 21, 22 is about 45°. Providing the birefringence Δn is suitably arranged, cf of the known expression Δnd/λ, the plane of polarization of light is rotated by 90°.

Polarization switches are useful for example in three dimensional (3-D) television. In this alternate left and right eye frames are displayed. An observer wears polarizing glasses and a polarization switch in front of the TV screen is switched in synchronism with the frame rate. This is described in G.B. 2,062,281 B. A similar effect is obtained if an observer wears glasses that have left and right eye liquid crystal shutters that are switched in synchronism with left and right eye frames on the TV screen.

EXAMPLES OF MATERIALS:

CHIRAL COMPONENTS

| Code | | Absolute configuration of chiral groups | Sense of cholesteric twist | Sense of spontaneous polarization |
|---|---|---|---|---|
| CC1 | 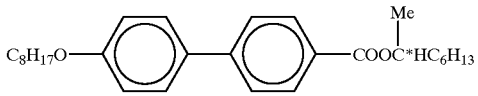 | S | L | (+) |
| CC2 | 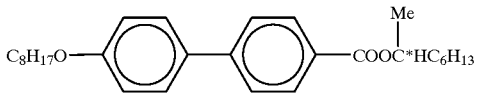 | R | D | (−) |
| CC3 | 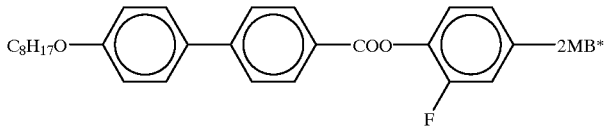 | S | D | (−) |
| CC4 | 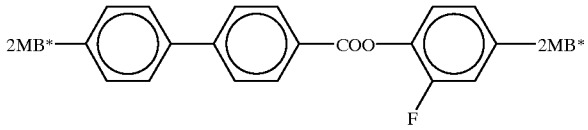 | SS | D | (+) |
| CC5 | 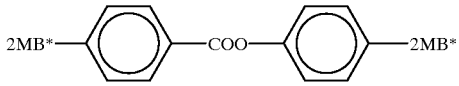 | SS | D | (+) |
| CC6 | 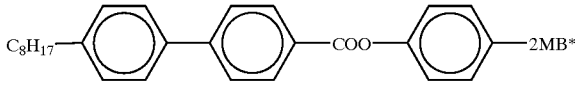 | S | D | (+) |
| CC7 | 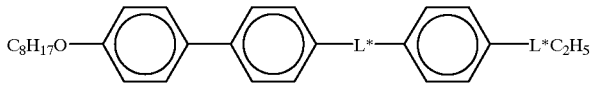 | SS | L | (+) |
| CC8 | 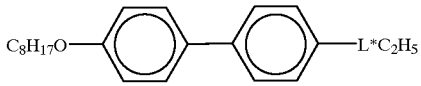 | S | L | (+) |

-continued

| Code | | Absolute configuration of chiral groups | Sense of cholesteric twist | Sense of spontaneous polarization |
|---|---|---|---|---|
| CC9 | $C_6H_{13}C^*(Me)HCOO—O—O—COOC^*HC_6H_{13}$ | SS | L | (+) |
| CC10 | $C_9H_{19}$—⟨benzene⟩—⟨benzene⟩—$COC^*(CN)HCH_3$ | — | L | (+) |
| CC11 | $C_3H_7$—⟨benzene⟩(F)—⟨benzene⟩—$OC^*(Me)HCO_2C_2H_5$ | — | D | (+) |
| CC12 | $C_9H_{19}$—⟨benzene⟩—⟨benzene⟩—⟨benzene⟩(Cl)—$OC^*(Me)CO_2C_2H_5$ | — | D | (+) |
| CC13 | $C_8H_{17}O$—⟨benzene⟩—⟨benzene⟩—$CO_2C^*(CN)HCH(Me)Me$ | — | D | (+) |

where 2MB*: —$CH_2C^*(Me)HC_2H_5$; and L* = —$COOC^*(Me)HCOO$—

-continued

Non-Chiral Materials

M1

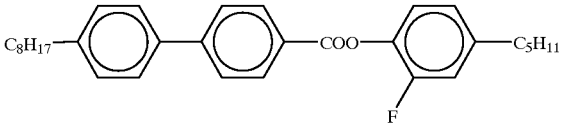

M2

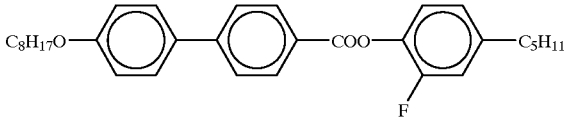

M3

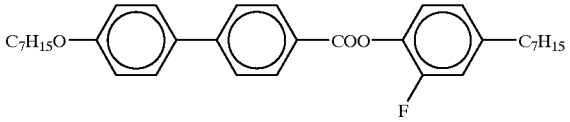

M4

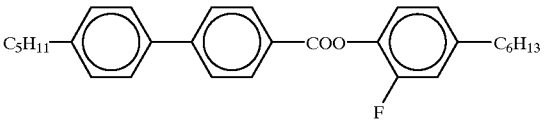

-continued

M5

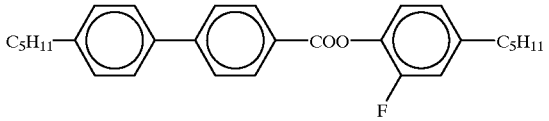

M6

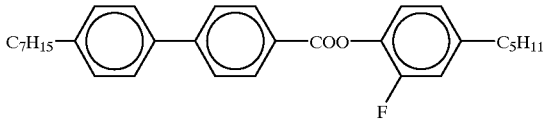

M7

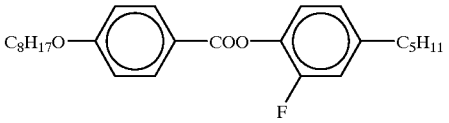

Racemate Materials

R1

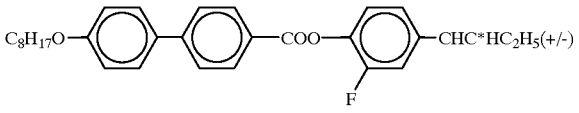

-continued

| Sc Host Mixtures | |
|---|---|
| Code Composition | Transition Temperature ° C. |
| H1: M1 + M2 + M3 (1:1:1) | Is 151.7 N 112.7 $S_A$ 107.3 $S_C$ 27.8 S |
| H2: M2 + M3 + R1 (1:1:1) | |
| H3: M1 + M6 + M4 (1:1:1) | Is N 60 $S_C$ |
| H4: M2 + M3 + M5 (1:1:1) | Is 155.8 N 89.7 $S_C$ 15 Solid |

Key:
Is = isotropic,
N = nematic,
S = smectic,
Ch = Cholesteric
Where no subscript is given to a smectic material the particular phase is unknown.

Key: Is=isotropic, N=nematic, S=smectic, Ch=cholesteric Where no subscript is given to a smectic material the particular phase is unknown.

EXAMPLE 1

(a) 7.9% R1
(b) 2.2% CC1
(c) 90% M6

This material had the following phases with increasing temperature solid—$S_C$*—$S_A$—cholesteric—Isotropic.

Materials (a), (b) have opposite senses of cholesteric twist, but the same sense of $S_C$* polarization.

When tested in a cell having a 6 μm thick layer excellent alignment was achieved on cooling down to the $S_A$ and then $S_C$* phases. When tested in a cell with a 12 μm thick layer the mixture showed a pi twist in the heated cholesteric phase. Providing the cooling rate was slow e.g. about 0.2° C./min. good alignment was achieved and the device could be rapidly switched using the ferroelectric effect. The spontaneous polarization Ps was measured to be about 1 nC/square cm.

The following Examples 2, 3, 4 use compensated chiral mixtures. These mixtures are composed of chiral components with opposite sense of cholesteric twist, but the same sense of S * spontaneous polarization.

EXAMPLE 2

CD1: −23% CC1+77% CC3.

This has the phase transition temperature of: Isotropic 114° Chol 93.4° $S_A$ 71.5° $S_C$* 50° Solid.

The cholesteric pitch/temperature curve is similar to FIG. 7b, the compensation temperature (i.e. where the pitch is infinite) occurs at ~99° C.

In a 2 μm cell, a π twist state can be maintained for up to 1° C. above the $S_A$ to cholesteric phase transition temperature; with slow cooling good alignment can be achieved in the smectic phases. A 61.5° C. the mixture showed a Ps~25 nC/cm$^2$ and a tilt angle (i.e. half cone angle) of ~18.5°.

EXAMPLE 3

CD3: −22% CC1+78% CC3.

This has the following phase transition temperatures: Isotropic 115° Chol 94.6° $S_A$ 72.6° $S_C$* 47° Solid.

The cholesteric pitch/temperature curve is similar to FIG. 7b; the compensation temperature (i.e. where the pitch is infinite) occurs at ~98° C.

In a 2 μm cell, a zero twist state can be obtained, and a π twist can be maintained for up to ~6° C. above the $S_A$ to cholesteric phase transition temperature.

EXAMPLE 4

CD9: −20% CC8+80% CC3.

This has the following phase transition temperatures: Isotropic 120.1° Chol 93.0° $S_A$ 78 0° $S_C$* 43° Solid.

The cholesteric pitch/temperature curve is similar to FIG. 7b, the compensation temperature (i.e. where the pitch is infinite) occurs at ~102° C.

In a 6 μm cell, a 2π twist state can be obtained for up to 0.5° C. above the $S_A$ to cholesteric phase transition.

Examples 5, 6, 7, 8 use a compensated chiral mixture in an $S_C$ host.

EXAMPLE 5

CM6=43.5% CD3+56.5% H1.

This has phase-temperature values: Isotropic 132.8° Cholesteric 106.8° $S_A$ 83.9° $S_C$* 14° S—solid.

The pitch/temperature curve is similar to FIG. 7b; the mixture being compensated (i.e. infinite pitch) at ~113° C. In a 2 μm and 6 μm cell, respectively, a zero twist state is obtained for up to 14° C. and up to 8° C. above the $S_A$ to cholesteric phase transition temperature. FIGS. 8 and 9 show the tilt angle (i.e. half cone angle) and spontaneous polarization, Ps, as a function of temperature for CM6.

EXAMPLE 6

CM8 19.6% (49% CC1+51% CC4)+80.4% H1

This has phase-temperature values: Isotropic 126.1° Cholesteric 84° $S_A$ 65° $S_C$* 5° S The pitch/temperature curve is similar to FIG. 7b; the mixture being compensated (i.e. infinite pitch) at ~119.5° C. In a 2 μm cell a zero twist state is obtained for a few °C. above the smectic A to cholesteric phase transition temperature.

EXAMPLE 7

CM3: −40% (20% CC1+80% CC3)+60% H3.

This has the following phase transition temperatures: Isotropic 127.5° Cholesteric 92.4° $S_A$ 72° $S_C$* 10° S.

The pitch/temperature curve is similar to FIG. 7c.

In a 6 μm cell a zero twist state is obtained for up to 3° C. above the smectic A to cholesteric phase transition temperature.

EXAMPLE 8

CM11: −25% CD9+75% H4.

This has the following phase transition temperatures: Isotropic 147.1° Chol 101.1° $S_A$ 85.1° $S_C$* 13° S.

The pitch/temperature curve is similar to FIG. 7b; the compensation temperature (i.e. where the pitch is infinite) occurs at ~119° C. In a 2 μm cell, a zero twist state can be obtained just above the smectic A to cholesteric phase transition temperature.

EXAMPLE 9

CM13: −90% (90% H4+10% M7)+10% (49% CC1+51% CC4)

Isotropic 135° Cholesteric 52.3° $S_C$* −15° S −25° C.

In a 6 μm cell, a 0° twist state was obtained for up to ~10° C. above the smectic A to cholesteric phase transition temperature. At 30° C. the spontaneous polarization of the mixture was 3.4 nC/cm$^2$ and the tilt angle (i.e. half the cone angle) was 21°.

EXAMPLE 10

CM 15: 15.9% (31.4% CC9+68.6% CC4)+94.1% H1.

Isotropic 135° Cholesteric 56.1° $S_C$* 20° Solid.

In a 6 μm cell, a π twist state was maintained for a few degrees Celsius above the smectic C* to Cholesteric transition. The alignment was poor after critically cooling into the $S_C$* phase, however, by applying ~20 Vpk 10 Hz square wave, zero twist alignment in the smectic C* could be induced. Heating back up to just into the cholesteric phase and cooling with a d.c. field of appropriate sign then gave the desired alignment.

At 50° C. and 30° C. the spontaneous polarization of the mixture is 2 nC/cm$^2$ and .6.2 nC/cm$^2$, respectively.

Examples 11, 12 use a single cholesteric twist sense chiral component in an $S_C$ host.

EXAMPLE 11

LPC2: 1% CC10+99% H1.

This mixture has the following phase transition temperatures: Isotropic 151° Cholesteric 113.5° $S_A$ 104.5° $S_C$* 28° S The cholesteric pitch/temperature curve is similar to FIG. 7c.

In a 2 μm cell, a zero twist state can be achieved for ~0.5° C. above the smectic A to cholesteric transition temperature.

The spontaneous polarization of the mixture is 1.7 nC/cm$^2$ and 4.2 nC/cm$^2$ at 80° C. and 40° C., respectively.

EXAMPLE 12

LPC3: 1% CC10+99% H4.

This mixture has the following phase transition temperatures: Isotropic 158° Cholesteric 91° $S_A$ 89° $S_C$* 18° S 8° S.

The cholesteric pitch/temperature curve is similar to FIG. 7c.

In a 2 μm cell, a zero twist state can be achieved for ~4° C. above the smectic A to cholesteric phase transition temperature.

EXAMPLE 13

LPC6: 0.5% CC10+99.5% (95% H4+5% M7)

Isotropic 152° Cholesteric 76.8° $S_C$*<0° S.

In a 6 μm cell, a zero twist state can be achieved for up to 0.2° C. above the smectic C* to cholesteric transition temperature.

EXAMPLE 14

UCM30: 92.5% (85% H4+15% M7)+7.5% CC12.

The mixture has the following phases

Is 155.8° Ch 60.5° $S_C$* 15° S.

The cholesteric pitch/temperature curve is similar to FIG. 7(c). Ps=4.4 nC/cm$^2$ at 50.5° C. and 8.4 nC/cm$^2$ at 25° C. In a 6.2 μm thick cell a zero twist state can be achieved for ~7° C. above the $S_C$* to cholesteric phase transition temperature.

EXAMPLE 15

CM20: 85% H1+15% CD18

This mixture has the following phases:

Is 133.7° Ch 92.8° SA 63.2 $S_C$*.

In a 2 μm thick cell a zero twist can be obtained just above the $S_A$ to Ch transition temperature.

Ps=18 nC/cm$^2$ at 25° C.

CD18=34% CC1+66% CC11

EXAMPLE 16

LPM13: 72.5% H1+25% M7+2.5% CC13

Is 118° Ch 56.3 Sc*<0 Solid.

Ps=10 nC/cm$^2$ at 20° C. and 5 nC/cm$^2$ at 46° C.

This shows zero twist in a 2 μm cell in the cholesteric phase.

We claim:

[1. A method of making a liquid crystal display device comprises the steps;

providing two cell walls spaced apart by a spacer to contain a layer of a liquid crystal material, the wall inner surfaces having formed thereon electrode structures and at least one wall surface treated to provide a liquid crystal alignment, providing a tilted chiral smectic liquid crystal material having a cholesteric phase at an elevated temperature above ambient between the chiral smectic and isotropic phases with a cholesteric pitch p greater than half the layer thickness d at a temperature at least 0.1° C. above a cholesteric to smectic transition temperature and a significant spontaneous polarization Ps in the chiral smectic phase, heating the material to the cholesteric phase, introducing and sealing the material into the space between the walls, cooling the material to the tilted chiral smectic phase.]

2. [The method of claim 1] *A method of making a liquid crystal display device comprising the steps:*

*providing two cell walls spaced apart by a spacer to contain a layer of a liquid crystal material, the wall inner surfaces having formed thereon electrode structures and at least one wall surface treated to provide a liquid crystal alignment,*

*providing a tilted chiral smectic liquid crystal material having a cholesteric phase at an elevated temperature above ambient between the chiral smectic and isotropic phases with a cholesteric pitch p greater than half the layer thickness d at a temperature at least 0.1° C. above a cholesteric to smectic transition temperature and a significant spontaneous polarization Ps n the chiral smectic phase,*

*heating the material to the cholesteric phase,*

*introducing and sealing the material into the space between the walls,*

*cooling the material to the tilted chiral smectic phase,* and comprising the further steps of reheating to above the smectic/cholesteric transition temperature and slowly cooling, whilst a unidirectional voltage pulse is applied.

[3. The method of claim 1 wherein the material is cooled at a rate of less than 20° C./minute within +/−5° C. of the cholesteric/smectic phase transition.]

[4. The method of claim 1 wherein the material is cooled at a rate of less than 2° C./minute within +/−5° C. of the cholesteric/smectic phase transition.]

5. The method of claim [1] *2* wherein both walls are surface alignment treated and the cell is arranged with the alignment direction parallel in the same direction.

6. The method of claim [1] *2* wherein both walls are surface alignment treated and the cell is arranged with the alignment direction parallel in opposite directions.

[7. The method of claim 1 wherein the alignment is produced by unidirectional rubbing.]

[8. The method of claim 1 wherein the alignment is produced by oblique evaporation of silicon oxide.]

9. A liquid crystal device comprising a layer of a tilted chiral smectic liquid crystal material contained between two cell walls each carrying electrode structures and at least one wall surface treated to give alignment to the liquid crystal molecules, a first linear polarizer and one of a second polarizer and an amount of dichroic dye in the liquid crystal material, the liquid crystal material having switched states and a tilted chiral smectic phase at normal device operating temperatures and a cholesteric phase at a higher, above ambient, temperature, with a cholesteric pitch greater than half the layer thickness d in the cholesteric phase for at least 0.1° C. above the cholesteric to smectic transition temperature, and a spontaneous polarization.

[10. The device of claim 9 wherein the cell walls are surface treated to align liquid crystal molecules in the same direction with a splayed configuration across the layer thickness.]

11. The device of claim 9 wherein the electrodes on each wall are formed as strip electrodes with strip electrodes on one wall forming an angle with strip electrodes on another wall thereby forming a matrix format.

12. The device of claim 9 wherein the electrodes are formed as strip electrodes arranged in a segment format.

13. The device of claim 9 wherein the electrodes are formed as sheet electrodes.

14. The device of claim 9 wherein the liquid crystal layer thickness is up to 15 $\mu$m.

15. The device of claim 9 wherein the cholesteric pitch p is greater than d/2 at a temperature at least 5° C. above the transition temperature.

[16. The device of claim 9 wherein one polarizer is a neutral polarizer and a second polarizer is comprised of two differently coloured polarizers arranged with their optical axis orthogonal with respect to each other.]

17. The device of claim 9 wherein said first polarizer is arranged with an optical axis parallel to the liquid crystal molecular alignment in one of said switched states, and another polarizer is arranged with an optical axis crossed with respect to the first polarizer.

18. The device of claim 9 wherein the cholesteric pitch within 0.1° C. of the cholesteric/smectic trasition is greater than four times the liquid crystal layer thickness.

19. The device of claim 9 and further comprising means for applying the two d.c. voltages of opposite polarity to the electrode structures to switch the liquid crystal material into two different states.

[20. A liquid crystal material mixture for use in a liquid crystal display device comprising a material having a tilted chiral smectic phase at normal device operating temperatures and a cholesteric phase at an elevated temperature, the mixture having a cholesteric pitch greater than 4 $\mu$m in the cholesteric phase at least 0.1° C. above a cholesteric to smectic transition temperature, and a substantial spontaneous polarization coefficient Ps, in the smectic phase.]

[21. The material of claim 20 wherein the material has the following phases with temperature:

isotropic⇆cholesteric⇆smectic A⇆chiral smectic⇆solid.]

[22. The material of claim 20 wherein the material has the following phases with temperature:

isotropic⇆cholesteric⇆chiral smectic⇆solid.]

[23. The material of claim 20 wherein the pitch in the cholesteric phase is greater than 4 $\mu$m over a temperature range up to 5° C. above the cholesteric smectic phase transition.]

[24. The material of claim 20 wherein the smectic pitch is greater than 2 $\mu$m.]

[25. The material of claim 20 wherein the spontaneous polarization is greater than 0.1 nC/cm$^2$.]

[26. The material of claim 20 wherein the cholesteric/smectic phase transition is above 40° C.]

[27. The material of claim 20 wherein the cholesteric smectic phase transition is above 100° C.]

[28. The material of claim 20 and further including an amount of a dichroic dye.]

*29. A method of making a liquid crystal display device comprises the steps:*

*providing two cell walls spaced apart by a spacer to contain a layer of a liquid crystal material, the wall inner surfaces having formed thereon electrode structures and at least one wall surface treated to provide a liquid crystal alignment,*

*providing a tilted chiral smectic liquid crystal material having a cholesteric phase at an elevated temperature above ambient between the chiral smectic and isotropic phases with a cholesteric pitch p greater than half the layer thickness d at a temperature for at least 0.1° C. above a cholesteric to smectic transition temperature and a significant spontaneous polarization Ps in the chiral smectic phase,*

*heating the material to the cholesteric phase,*

*introducing and sealing the material into the space between the walls,*

*cooling the material to the tilted chiral smectic phase, and*

*realigning the liquid crystal material with respect to said at least one treated wall surface.*

*30. The method of claim 29 wherein said step of realigning comprises the steps of reheating said liquid crystal material to above the smectic/cholesteric temperature and recooling to below the smectic/cholesteric transition temperature.*

*31. The method of claim 30, wherein said recooling step includes the step of recooling whilst a unidirectional voltage pulse is applied.*

*32. A method of making a liquid crystal display device comprises the steps:*

*providing two cell walls spaced apart by a spacer to contain a layer of a liquid crystal material, the wall inner surfaces having formed thereon electrode structures and at least one wall surface treated to provide a liquid crystal alignment,*

*providing a tilted chiral smectic liquid crystal material having a cholesteric phase at an elevated temperature above ambient between the chiral smectic and isotropic phases with a cholesteric pitch p greater than half the layer thickness d at a temperature for at least 0.1° C. above a cholesteric to smectic transition temperature and a significant spontaneous polarization Ps in the chiral smectic phase,*

*heating the material to the cholesteric phase,*

*introducing and sealing the material into the space between the walls,*

*cooling the material to the tilted chiral smectic phase, wherein both walls are surface alignment treated and the cell is arranged with the alignment direction parallel in the same direction.*

*33. The method of claim 32, wherein said step of surface alignment treating of said walls comprises providing surface alignment and surface tilt.*

34. A method of making a liquid crystal display device comprises the steps:

providing two cell walls spaced apart by a spacer to contain a layer of a liquid crystal material, the wall inner surfaces having formed thereon electrode structures and at least one wall surface treated to provide a liquid crystal alignment, providing a tilted chiral smectic liquid crystal material having a cholesteric phase at an elevated temperature above ambient between the chiral smectic and isotropic phases with a cholesteric pitch p greater than half the layer thickness d at a temperature for at least 0.1° C. above a cholesteric to smectic transition temperature and a significant spontaneous polarization Ps in the chiral smectic phase, heating the material to the cholesteric phase, introducing and sealing the material into the space between the walls, cooling the material to the tilted chiral smectic phase, wherein both walls are surface alignment treated and the cell is arranged with the alignment direction parallel in opposite direction.

35. The method of claim 34, wherein said step of surface alignment treating of said walls comprises providing surface alignment and surface tilt.

36. A liquid crystal device comprising a layer of a tilted chiral smectic liquid crystal material contained between two cell walls each carrying electrode structures and at least one wall surface treated to give alignment to the liquid crystal molecules, a first linear polarizer and one of a second polarizer and an amount of dichroic dye in the liquid crystal material, the liquid crystal material having switched states and a tilted chiral smectic phase at normal device operating temperatures and a cholesteric phase at a higher, above ambient, temperature, with a cholesteric pitch greater than half the layer thickness d in the cholesteric phase for at least 0.1° C. above the cholesteric to smectic transition temperature, and a spontaneous polarization, wherein the cell walls are surface treated to align liquid crystal molecules in the same direction with a splayed configuration across the layer thickness.

37. A liquid crystal device comprising a layer of a tilted chiral smectic liquid crystal material contained between two cell walls each carrying electrode structures and both wall surfaces treated to give parallel alignment and surface tilt to the liquid crystal molecules, a first linear polarizer and one of a second polarizer and an amount of dichroic dye in the liquid crystal material, the liquid crystal material having switched states and a tilted chiral smectic phase at normal device operating temperatures and a cholesteric phase at a higher, above ambient, temperature, with a cholesteric pitch greater than half the layer thickness d in the cholesteric phase for at least 0.1° C. above the cholesteric to smectic transition temperature, and a spontaneous polarization.

38. The device of claim 37, wherein said surface tilt is about 2°.

39. The device of claim 37, wherein said liquid crystal material is comprised of a liquid crystal material having the following phases with temperature:

cholesteric⇆smectic A⇆chiral smectic.

40. The device of claim 38, wherein said liquid crystal material is comprised of a liquid crystal material having the following phases with temperature:

cholesteric⇆smectic A⇆chiral smectic.

41. The device of claim 37, wherein said wall surfaces are treated to give parallel alignment in the same direction.

42. The device of claim 37, wherein said wall surfaces are treated to give parallel alignment in the opposite direction.

43. The device of claim 41, wherein said wall surfaces are treated to provide a splayed configuration across the layer thickness.

44. A liquid crystal device comprising a layer of a tilted chiral smectic liquid crystal material contained between two cell walls each carrying electrode structures and at least one wall surface treated to give alignment to the liquid crystal molecules, a first linear polarizer and one of a second polarizer and an amount of dichroic dye in the liquid crystal material, the liquid crystal material having switched states and a tilted chiral smectic phase at normal device operating temperatures and a cholesteric phase at a higher, above ambient, temperature, with a cholesteric pitch greater than half the layer thickness d in the cholesteric phase for at least 0.1° C. above the cholesteric to smectic transition temperature, and a spontaneous polarization, said align liquid crystal material having substantially zero twist above the cholesteric to smectic transition temperature.

45. The device of claim 44, wherein said zero twist is from the cholesteric to smectic transition temperature to a temperature at least 3° C. above the cholesteric to smectic transition temperature.

46. The device of claim 44, wherein said zero twist is from the cholesteric to smectic transition temperature to a temperature at least 8° C. above the cholesteric to smectic transition temperature.

47. A liquid crystal device comprising a layer of a tilted chiral smectic liquid crystal material contained between two cell walls each carrying electrode structures and at least one wall surface treated to give alignment to the liquid crystal molecules, a first linear polarizer and one of a second polarizer and an amount of dichroic dye in the liquid crystal material, the liquid crystal material having switched states and a tilted chiral smectic phase at normal device operating temperatures and a cholesteric phase at a higher, above ambient, temperature, with a cholesteric pitch greater than half the layer thickness d in the cholesteric phase for at least 0.1° C. above the cholesteric to smectic transition temperature, and a spontaneous polarization, one polarizer is a neutral polarizer and a second polarizer is comprised of two differently colored polarizers arranged with their optical axis orthogonal with respect to each other.

48. The device of 11, further including driver circuits connected to said electrodes.

49. A liquid crystal material mixture for use in a liquid crystal display device comprising a material having a tilted chiral smectic phase at normal device operating temperatures and a cholesteric phase at an elevated temperature, the mixture having a cholesteric pitch greater than 4 μm in the cholesteric phase at least 0.1° C. above a cholesteric to smectic transition temperature and a substantial spontaneous polarization coefficient Ps, in the smectic phase, wherein said mixture has substantially zero twist at a temperature above the cholesteric to smectic transition temperature in a liquid crystal cell.

50. The material of claim 49 wherein the material has the following phases with temperature:

isotropic⇆cholesteric⇆smectic A⇆chiral smectic⇆solid.

51. The material of claim 49 wherein the material has the following phases with temperature:

isotropic⇆cholesteric⇆chiral smectic⇆solid.

52. The material of claim 49 wherein the pitch in the cholesteric phase is greater than 4 μm over a temperature range up to 5° C. above the cholesteric smectic phase transition.

*53. The material of claim 49 wherein the smectic pitch is greater than 2 μm.*

*54. The material of claim 49 wherein the spontaneous polarization is greater than 0.1 nC/cm$^2$.*

*55. The material of claim 49 wherein the cholesteric/smectic phase transition temperature is above 40° C.*

*56. The material of claim 49 wherein the cholesteric/smectic phase transition temperature is above 100° C.*

*57. The material of claim 49 and further including an amount of a dichroic dye.*

*58. The material of claim 49 wherein said mixture has a zero twist from the cholesteric to smectic transition temperature to a temperature at least 3° C. above the cholesteric to smectic transition temperature.*

*59. The material of claim 49 wherein said mixture has a zero twist from the cholesteric to smectic transition temperature to a temperature at least 8° C. above the cholesteric to smectic transition temperature.*

*60. A method of making a liquid crystal display device in accordance with claim 1, wherein said liquid crystal material has substantially zero twist at a temperature above the cholesteric to smectic transition temperature.*

*61. A method of making a liquid crystal display device in accordance with claim 9, wherein said liquid crystal material has substantially zero twist at a temperature above the cholesteric to smectic transition temperature.*

*62. A method of making a liquid crystal display device comprises the steps:*

*providing two cell walls spaced apart by a spacer to contain a layer of a liquid crystal material, the wall inner surfaces having formed thereon electrode structures and at least one wall surface treated to provide a liquid crystal alignment,*

*providing a tilted chiral smectic liquid crystal material having a cholesteric phase at an elevated temperature above ambient between the chiral smectic and isotropic phases with a substantially zero twist cholesteric pitch p at a temperature for at least 0.1° C. above a cholesteric to smectic transition temperature and a significant spontaneous polarization Ps in the chiral smectic phase,*

*heating the material to the cholesteric phase,*

*introducing and sealing the material into the space between the walls,*

*cooling the material at a controlled rate from the cholesteric phase to the tilted chiral smectic phase, and*

*realigning the liquid crystal material with respect to said at least one treated wall surface.*

*63. The method of claim 62 wherein said step of realigning comprises the steps of reheating said liquid crystal material to above the smectic/cholesteric transition temperature and recooling to below the smectic/cholesteric transition temperature.*

*64. The method of claim 63, wherein said recooling step includes the step of recooling whilst a unidirectional voltage pulse is applied.*

*65. The method of claim 62 wherein the material is cooled at a rate of less than 20° C./minute within +/−5° C. of the cholesteric/smectic phase transition.*

*66. The method of claim 62 wherein the material is cooled at a rate of less than 2° C./minute within +/−5° C. of the cholesteric/smectic phase transition.*

*67. The method of claim 62 wherein both walls are surface alignment treated and the cell is arranged with the alignment direction parallel in the same direction.*

*68. The method of claim 62 wherein both walls are surface alignment treated and the cell is arranged with the alignment direction parallel in opposite directions.*

*69. The method of claim 62 wherein the alignment is produced by the unidirectional rubbing.*

*70. The method of claim 62 wherein the alignment is produced by oblique evaporation of silicon oxide.*

*71. The method of claim 29, wherein said step of realigning comprises the step of applying pulses of an alternating voltage to said liquid crystal material while in said smectic phase to give zero twist in said smectic phase.*

*72. The method of claim 29, wherein said step of realigning comprises the steps of applying pulses of an alternating voltage to said liquid crystal material while in said smectic phase to give zero twist alignment in said smectic phase, reheating said liquid crystal material to above the smectic/cholesteric transition temperature and recooling to below the smectic/cholesteric transition temperature.*

*73. The method of claim 29, wherein said step of realigning comprises the steps of applying pulses of an alternating voltage to said liquid crystal material while in said smectic phase to give zero twist alignment in said smectic phase, reheating said liquid crystal material to above the smectic/cholesteric transition temperature and recooling to below the smectic/cholesteric transition temperature while a unidirectional voltage pulse is applied.*

*74. The method of claim 2, wherein said liquid crystal material has a smectic pitch greater than 0.1 μm in its smectic phase.*

*75. The method of claim 29, wherein said liquid crystal material has a smectic pitch greater than 0.1 μm in its smectic phase.*

*76. The method of claim 2, wherein said liquid crystal material has a smectic pitch greater than said layer thickness d in its smectic phase.*

*77. The method of claim 29, wherein said liquid crystal material has a smectic pitch greater than said layer thickness d in its smectic phase.*

*78. The device of claim 9, including means for heating the liquid crystal material to its cholesteric phase and for applying a unidirectional voltage to said material while said material cools to its tilted chiral smectic phase.*

*79. The device of claim 9, wherein said liquid crystal material at a normal device operating temperature has a smectic pitch of greater than 0.1 μm.*

*80. The device of claim 9, wherein said liquid crystal material at a normal device operating temperature has a smectic pitch of greater than said layer thickness d.*

*81. The method of claim 2, wherein said material has zero twist at a temperature up to 14° C. above the cholesteric to smectic transition temperature.*

*82. The method of claim 29, wherein both walls are surface treated to provide similar alignment in the same direction.*

*83. The method of claim 29, wherein both walls are surface treated to provide similar alignment in different directions.*

* * * * *